(12) United States Patent
Li et al.

(10) Patent No.: US 12,547,667 B2
(45) Date of Patent: Feb. 10, 2026

(54) PAGE DISPLAYING METHOD, APPARATUS AND ELECTRONIC DEVICE (71) Applicant: Beijing Zitiao Network Technology Co., Ltd., Beijing (CN)

(72) Inventors: Hongfu Li, Beijing (CN); Jiangcun Ding, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 19 days.

(21) Appl. No.: 18/320,665

(22) Filed: May 19, 2023

(65) Prior Publication Data
US 2023/0385361 A1 Nov. 30, 2023

(30) Foreign Application Priority Data
May 31, 2022 (CN) .......................... 202210612445.X (51) Int. Cl.
G06F 16/957 (2019.01)
G06F 3/04817 (2022.01)
G06F 3/0485 (2022.01)

(52) U.S. Cl.
CPC ........ G06F 16/957 (2019.01); G06F 3/04817 (2013.01); G06F 3/0485 (2013.01)

(58) Field of Classification Search
None
See application file for complete search history.

(56) References Cited

U.S. PATENT DOCUMENTS

| 9,332,298 | B2* | 5/2016 | Suk ..................... H04N 21/482 |
| 10,133,310 | B2* | 11/2018 | Kim ........................ G06F 3/147 |
| 2013/0176244 | A1* | 7/2013 | Yamamoto ......... H04N 21/4826 345/173 |
| 2014/0123013 | A1* | 5/2014 | Lee ................... H04M 1/72427 715/719 |
| 2014/0247463 | A1* | 9/2014 | Kemmochi ............... G06F 3/14 358/1.15 |
| 2014/0347264 | A1* | 11/2014 | Lee ....................... G06F 1/1652 345/156 |

(Continued)

FOREIGN PATENT DOCUMENTS

| CN | 111752440 A | 10/2020 |
| CN | 112016978 A | 12/2020 |

(Continued)

OTHER PUBLICATIONS

China National Intellectual Property Administration, Office Action Issued in Application No. 202210612445.X, Apr. 25, 2024, 15 pages.

(Continued)

Primary Examiner — Toan H Vu
(74) Attorney, Agent, or Firm — Alleman Hall LLP (57) ABSTRACT

The present disclosure provides a page displaying method and apparatus, and an electronic device, where the method includes: displaying a first page, where a first area of the first page displays a picture corresponding to first multimedia; in response to a first operation in the first area, switching the picture corresponding to the first multimedia to a picture corresponding to second multimedia; and in response to a second operation in a second area of the first page, switching the first page to a second page.

17 Claims, 6 Drawing Sheets

(56) References Cited

U.S. PATENT DOCUMENTS

| | | | | |
|---|---|---|---|---|
| 2015/0024728 | A1* | 1/2015 | Jang | G06F 3/012 |
| | | | | 455/418 |
| 2017/0329484 | A1* | 11/2017 | Huang | G06F 3/0488 |
| 2020/0372065 | A1 | 11/2020 | Bragdon | |
| 2021/0243502 | A1* | 8/2021 | Choi | H04N 21/26603 |
| 2022/0050559 | A1 | 2/2022 | Feng et al. | |
| 2022/0342520 | A1* | 10/2022 | Yamada | G06F 3/0488 |

FOREIGN PATENT DOCUMENTS

| | | |
|---|---|---|
| CN | 112153454 A | 12/2020 |
| CN | 112261226 A | 1/2021 |
| CN | 113111195 A | 7/2021 |
| CN | 113111286 A | 7/2021 |
| CN | 113536157 A | 10/2021 |
| CN | 113868446 A | 12/2021 |
| CN | 114139073 A | 3/2022 |
| CN | 115048597 A | 9/2022 |
| JP | 2007195186 A | 8/2007 |
| WO | 2022068819 A1 | 4/2022 |

OTHER PUBLICATIONS

ISA China National Intellectual Property Administration, International Search Report Issued in Application No. PCT/CN2023/097566, Aug. 23, 2023, WIPO, 10 pages.

"Instagram's Vertical Scrolling is 'Still' Not Over! Instagram's Regrettable Mistake 'Swipe/Tap for Horizontal Scrolling Posts' —Is It a Bug ?! Latest News & Updates on Instagram's New Features for 2018-2019," KT Tech & Life, Available Online at https://koukichi-t.com/archives/9065, Dec. 28, 2018, 29 pages.

Japan Patent Office, Office Action Issued in Application No. 2024-563724, Oct. 14, 2025, 10 pages.

Prebell, "[Introduction to how to use TikTok] Thorough explanation from viewing to video posting," So-Net, Available Online at https://prebell.so-net.ne.jp/tips/pre_19081301.html, Aug. 13, 2019, 50 pages.

* cited by examiner

PAGE DISPLAYING METHOD, APPARATUS AND ELECTRONIC DEVICE

CROSS-REFERENCE TO RELATED APPLICATIONS

This application claims priority to Chinese Patent Application No. 202210612445.X, filed on May 31, 2022, which is hereby incorporated by reference in its entirety.

TECHNICAL FIELD

The present disclosure relates to the technical field of computer, and in particular, to a page displaying method and apparatus, and an electronic device.

BACKGROUND

With continuous development of network technology, digital network media (for example, various social entertainment web pages) are more and more used in people's lives, providing more entertainment services for people's lives and bringing more convenience. At present, content of web pages is usually displayed in a form of long images, the display effect of which cannot meet the needs of users. Besides, such a single form of interaction affects user experience.

SUMMARY

The present disclosure provides a page displaying method and apparatus, and an electronic device.

According to a first aspect, a page displaying method is provided, where the method includes:
- displaying a first page, wherein a first area of the first page displays a picture corresponding to first multimedia;
- in response to a first operation in the first area, switching the picture corresponding to the first multimedia to a picture corresponding to second multimedia; and
- in response to a second operation in a second area of the first page, switching the first page to a second page.

According to a second aspect, a page displaying apparatus is provided, where the apparatus includes:
- a first displaying module, configured to display a first page, wherein a first area of the first page displays a picture corresponding to first multimedia;
- a first switching module, configured to switch, in response to a first operation in the first area, the picture corresponding to the first multimedia to a picture corresponding to second multimedia; and
- a second switching module, configured to switch, in response to a second operation in a second area of the first page, the first page to a second page.

According to a third aspect, a computer program product is provided, the computer program product includes a computer program, when the computer program is executed by a processor, the method according to any one of the above-mentioned first aspect is implemented.

According to a fourth aspect, a computer-readable storage medium is provided, the storage medium includes a computer program, when the computer program is executed by a processor, the method according to any one of the above-mentioned first aspect is implemented.

According to a fifth aspect, an electronic device is provided, the electronic device includes a memory, a processor, and a computer program stored on the memory and executable on the processor, when the processor executes the program, the method according to any one of the above-mentioned first aspect is implemented.

It shall be understood that, the above general description and the following detailed description are exemplary and illustrative only, and should not limit the present disclosure.

BRIEF DESCRIPTION OF DRAWINGS

In order to describe the technical solution of the embodiments of the present specification more clearly, in the following, the drawings that need to be used in the description of the embodiments will be briefly introduced. Obviously, the drawings in the following description are only some of the embodiments recorded in the present specification, and for those of ordinary skills in the art, other drawings can be obtained according to these drawings without making creative efforts.

DESCRIPTION OF EMBODIMENTS

In order to make people in the technical field better understand the technical solutions in the present specification, the technical solutions in the embodiments of the present specification will be clearly and completely described below with reference to the drawings in the embodiments of the present specification. Obviously, the described embodiments are only part of the embodiments of the present specification, but not all of them. Based on the embodiments in the present specification, all other embodiments obtained by those of ordinary skills in the art without making creative efforts should belong to the scope of protection of the present specification.

When reference is made the drawings in the following description, unless otherwise indicated, the same numbers in different drawings indicate the same or similar elements. The embodiments described in the following exemplary embodiments do not represent all the embodiments consistent with the present application. On the contrary, they are only examples of apparatuses and methods consistent with some aspects of the present application as described in detail in the appended claims.

The terminology used in the present disclosure is for the purpose of describing specific embodiments only, and is not intended to limit the present application. The singular forms "a", "said" and "the" used in the present disclosure and the appended claims are also intended to include plural forms, unless the context clearly indicates other meaning. It should also be understood that the term "and/or" used herein refers to and includes any or all possible combinations of one or more associated listed items.

It should be understood that although the terms first, second, third, etc., may be used in the present disclosure to describe various information, these information should not be limited to these terms. These terms are only used to distinguish the same type of information from each other. For example, without departing from the scope of the present disclosure, first information may also be referred to as second information, and similarly, the second information may also be referred to as the first information. Depending on the context, the word "if" as used here can be interpreted as "when" or "upon" or "in response to a determination".

With continuous development of network technology, digital network media are more and more used in people's lives, providing more entertainment services for people's lives and bringing more convenience. Social entertainment web pages are the most widely used digital network media. At present, in related arts, content of web pages is usually displayed in a form of long images, the user needs to roll a mouse wheel, or drag a scroll bar to browse the long image in the web page, which is inconvenient to operate, the display effect cannot meet the needs of users. Besides, such a single form of interaction affects user experience.

The present disclosure provides a page displaying method, when a multimedia page is displayed, a picture (frame) corresponding to the multimedia is displayed in a first area of the multimedia page, and when an operation in the first area is detected, the picture corresponding to the multimedia displayed in the first area is switched, and when an operation in a second area that is different from the first area is detected, the multimedia page is switched, so as to present a dynamic display effect of a web page for users, thereby better meeting users' needs, realizing richer interaction modes, providing users with a faster operation way, thus improving user experience.

Figure 1:
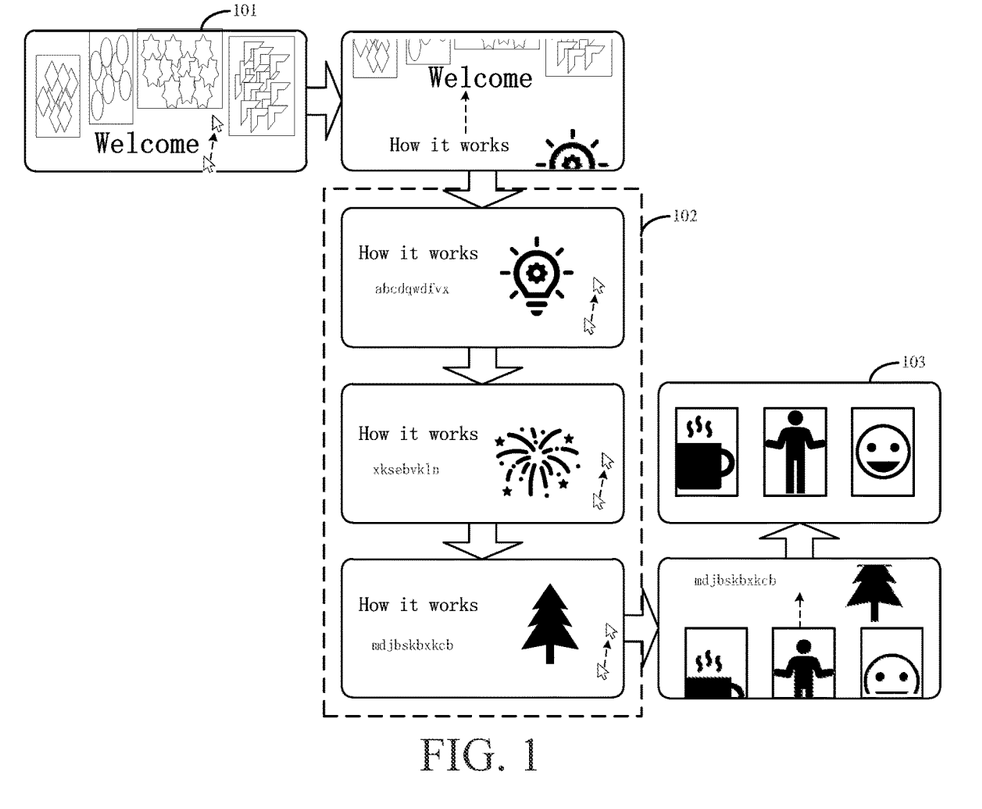
FIG. 1 is a schematic diagram of a scenario of a page displaying solution presented according to an exemplary embodiment of the present disclosure.

Referring to FIG. 1, FIG. 1 is a schematic diagram of a scenario of a page displaying solution presented according to an exemplary embodiment.

As shown in FIG. 1, a page displayed on a computer is taken as an example, where the page may be a front page or welcome page of a website, and the page may include a first screen 101, a second screen 102 and a third screen 103. When a user requests to access the page, first screen content is first displayed on the first screen 101, where the first screen content may include video content and text content. For example, the first screen 101 can be divided into 4 areas, each area dynamically displays its own exemplary video, and displays the text content at a position floating above the exemplary video.

When the user pulls up the first screen content with the mouse, the first screen 101 moves up, the second screen 102 gradually moves in, and the first screen 101 is switched to the second screen 102. The second screen 102 includes an area a and an area b, where the area a is used to display an introduction in text form and the area b is used to display an exemplary video corresponding to the text-form introduction. On the one hand, if the user directly slides up the mouse once in the area a, the area b of the second screen 102 shrinks, and the second screen 102 moves up, and the third screen 103 gradually moves in, the second screen 102 is switched to the third screen 103.

On the other hand, if the user slides up a control apparatus (such as a mouse) in the area b, the content displayed on the second screen 102 is switched. For example, second screen content to be displayed on the second screen 102 includes text a1, video b1, text a2, video b2, text a3 and video b3. After the first screen 101 is switched to the second screen 102, at first, the text a1 will be displayed in the area a of the second screen 102, and the video b1 will be displayed in the area b. After the user slides up the mouse in the area b, the area a of the second screen 102 switches the displayed text a1 to the text a2, and the area b switches the displayed video b1 to the video b2. After the user slides up the mouse again in the area b, the area a of the second screen 102 switches the displayed text a2 to the text a3, and the area b switches the displayed video b2 to the video b3. If the user slides up the mouse again in the area b, the area b of the second screen 102 shrinks, the second screen 102 moves up, and the third screen 103 gradually moves in. The third screen 103 can include a plurality of areas for displaying videos, and a video to be played can be selected through the mouse.

It can be understood that the above embodiment mainly describes a process of switching page content in a forward direction, and the user can also switch page content in a backward direction by sliding the mouse in a reverse direction. For example, when the third screen 103 displays the video to be played, the mouse is slid down, the third screen 103 moves down, the second screen 102 moves in gradually, the area a of the second screen 102 displays the text a3, and the area b displays the video b3. The user slides down the mouse in the area b, the area a of the second screen 102 switches the displayed text a3 to the text a2, and the area b switches the displayed video b3 to the video b2. After the user slides down the mouse again in the area b, the area a of the second screen 102 switches the displayed text a2 to the text a1, and the area b switches the displayed video b2 to the video b1. If the user slides down the mouse again in the area b, the second screen 102 moves down, the first screen 101 gradually moves in, and the second screen 102 is switched to the first screen 101. The detailed process of switching back page content is not repeated here.

The present disclosure will be described in detail below with reference to specific embodiments.

Figure 2A:
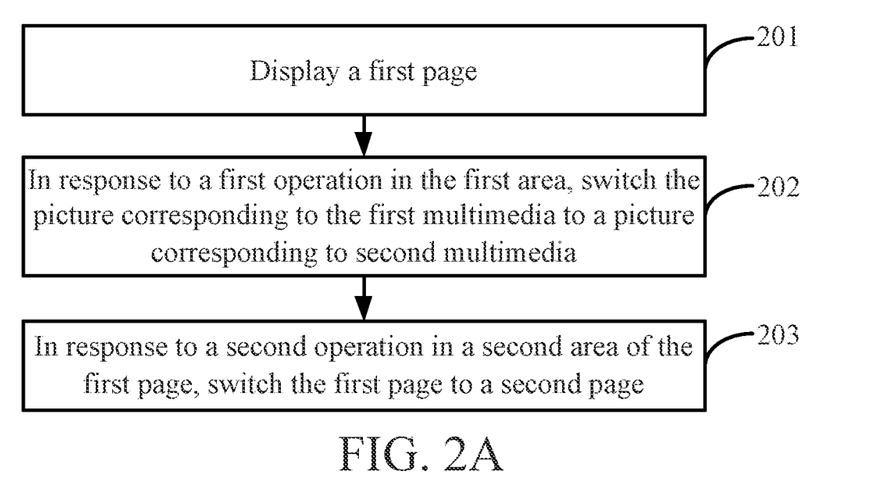
FIG. 2A is a flowchart of a page displaying method presented according to an exemplary embodiment of the present disclosure.

FIG. 2A is a flowchart of a page displaying method presented according to an exemplary embodiment. The method may be applied to a terminal device. In the present embodiment, for convenience of understanding, it is illustrated by taking a terminal device capable of displaying web pages as an example. Those of ordinary skills in the art can understand that this terminal device may include, but is not limited to, a mobile terminal device such as a smart phone, a tablet computer, a desktop computer, etc. The method may include the following steps.

As shown in FIG. 2A, in step 201, display a first page (first multimedia page).

In the present embodiment, the first page, the second page (second multimedia page) and the third page (third multimedia page) are all multimedia pages, the multimedia page may be a page embedded with various multimedia elements, and the multimedia page related to the present embodiment may be a web page or a page of an application. It can be understood that the specific form of the multimedia page is not limited in the present embodiment.

Figure 2B:
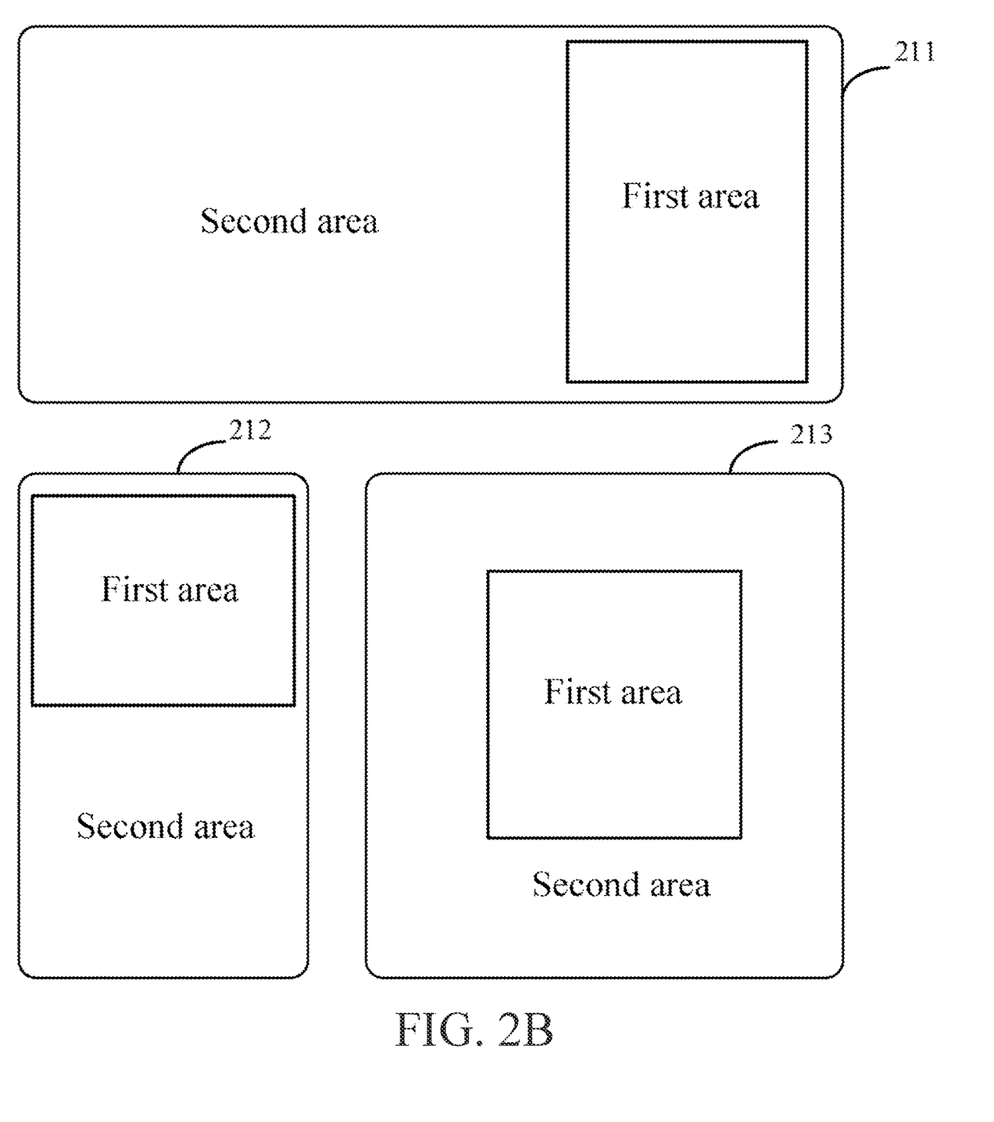
FIG. 2B is a schematic diagram of page arrangement of a multimedia page presented according to an exemplary embodiment of the present disclosure.

Specifically, the first page may include a first area and a second area, which are different areas without overlapping. As shown in FIG. 2B, the first area and the second area may be in a "left and right" arrangement (such as an interface 211), or in an "up and down" arrangement (such as an interface 212), or arranged in an embedded manner (such as an interface 213). The specific arrangement of the first area and the second area is not limited in the present embodiment.

The first area of the first page displays a picture corresponding to first multimedia. The first multimedia may include video content (e.g., an exemplary video, etc.), and the corresponding picture of the first multimedia may be the picture played in the video content. The first area may include a multimedia playing window through which the above mentioned video content can be played. The first multimedia may also include pictures, animations, audios and other elements, and the specific form of the first multimedia is not limited in the present embodiment.

In an embodiment, the first multimedia may also include content in text form, for example, the content in text form may be introduction information corresponding to the video content, and the introduction information in text form may be displayed in the second area of the first page. Therefore, on the first page, a group of related multimedia content can be displayed at the same time, including at least video pictures and corresponding introduction information, so that the multimedia content can be vividly displayed to users by means of pictures and texts, thereby improving the display effect of the web page.

In step 202, in response to a first operation in the first area, switch the picture corresponding to the first multimedia to a picture corresponding to second multimedia.

In the present embodiment, the first operation in the first area may be a preset operation performed by the user in the first area, for example, the first operation may be a sliding operation in the first area performed by the user, or the first operation may be an operation of switching to a forward direction or a reverse direction. In one implementation, if the first page is a web page, and the user browses the first page through a device such as a desktop computer, the first operation may be an operation of clicking the left/right mouse button to slide in a preset direction in the first area. For example, the first operation may specifically be an operation of clicking the left mouse button to slide up/down/left/right/clockwise/counterclockwise in the first area, etc.

In another implementation, if the first page is a page of an application program, the user browses the first page through a device such as a mobile terminal, the first operation may be an operation of sliding in a preset direction in the first area through a touch screen. For example, the first operation may specifically be an operation of sliding up/down/left/right/clockwise/counterclockwise in the first area through the touch screen, etc.

In the present embodiment, when the first operation in the first area is detected, the picture corresponding to the first multimedia can be switched to the picture corresponding to the second multimedia. Specifically, the content displayed on the first page may at least include the second multimedia in addition to the first multimedia. The second multimedia may also include video content and text content, etc. The video content included in the second multimedia can be played through the multimedia playing window in the first area, and the text content included in the second multimedia can be displayed in the second area of the first page. Where the switching the picture corresponding to the first multimedia to the picture corresponding to the second multimedia is specifically to switch the video picture corresponding to the first multimedia displayed in the first area to the video picture corresponding to the second multimedia. At the same time, the introduction information corresponding to the first multimedia displayed in the second area is switched to the introduction information corresponding to the second multimedia.

Specifically, the first multimedia and the second multimedia correspond to a target multimedia set to be presented, the target multimedia set includes a plurality of multimedia arranged in a preset order; the first multimedia and the second multimedia are multimedia arranged adjacently in the target multimedia set. When multimedia currently displayed in the first area is multimedia arranged in a last position in the target multimedia set, and if an operation of switching to a forward direction is detected, switch the first page to the second page.

For example, when the first operation in the first area is detected, the multimedia content displayed on the first page may be switched. The multimedia content includes content 1 (video 1 and text 1), content 2 (video 2 and text 2) and content 3 (video 3 and text 3) in a display order along the forward direction. If the first operation is an operation of switching to the forward direction, when the first page displays the content 1, if the first operation is detected, the content 1 may be switched to the content 2, and if the first operation is detected again, the content 2 may be switched to the content 3. If the first operation is detected again, the first page is switched to the second page. If the first operation is an operation of switching to the backward direction, when the first page displays the content 3, if the first operation is detected, the content 3 may be switched to the content 2, and if the first operation is detected again, the content 2 may be switched to the content 1.

As in the present embodiment, the first page can be directly switched through the operation in the second area, or can be switched by switching the multimedia arranged in the last position among the plurality of multimedia in the target multimedia set, more choices are provided for users, different requirements of users can be better met, interaction modes are further enriched, and user experience is improved.

In step 203, in response to a second operation in a second area of the first page, switch the first page to a second page.

In the present embodiment, the second operation in the second area of the first page may be a preset operation performed by the user in the second area, and the second operation may be an operation of switching to the forward direction. For example, the second operation may be a sliding operation performed by the user in the second area, or a clicking operation performed by the user in the second area.

When the second operation in the second area is detected, the first area of the first page can be shrunk, the first page moves up, and the second page moves in gradually, and the page content of the second page can be displayed. In an embodiment, when the page content of the second page is displayed, if a backward operation on the second page is detected, the second page is switched back to the first page. The backward operation on the second page may be a preset operation performed by the user on the second page, or an operation of switching to the backward direction.

Figure 2C:
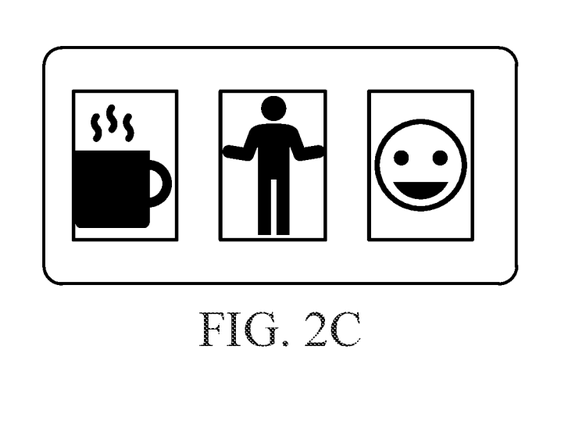
FIG. 2C is a schematic diagram of another page arrangement of a multimedia page present according to an exemplary embodiment of the present disclosure.

In an embodiment, as shown in FIG. 2C, a plurality of second multimedia playing windows may be displayed on the second page, the respective second multimedia playing window displays a picture of corresponding candidate multimedia. When a fourth operation on any multimedia playing window is detected, the picture of the candidate multimedia corresponding to the multimedia playing window may be played. For example, the fourth operation may be an operation of clicking the multimedia playing window or hovering a mouse cursor position over the multimedia playing window, so that the multimedia can be automatically played through a convenient and simple operation, which simplifies the operation and further improves the user experience.

The present disclosure provides a page displaying method, when a multimedia page is displayed, a picture corresponding to the multimedia is displayed in a first area of the multimedia page, and when an operation in the first area is detected, the picture corresponding to the multimedia displayed in the first area is switched, and when an operation in a second area that is different from the first area is detected, the multimedia page is switched, so as to present a dynamic display effect of a web page for users, thereby better meeting users' needs, realizing richer interaction modes, providing users with a faster operation way, thus improving user experience.

Figure 3:
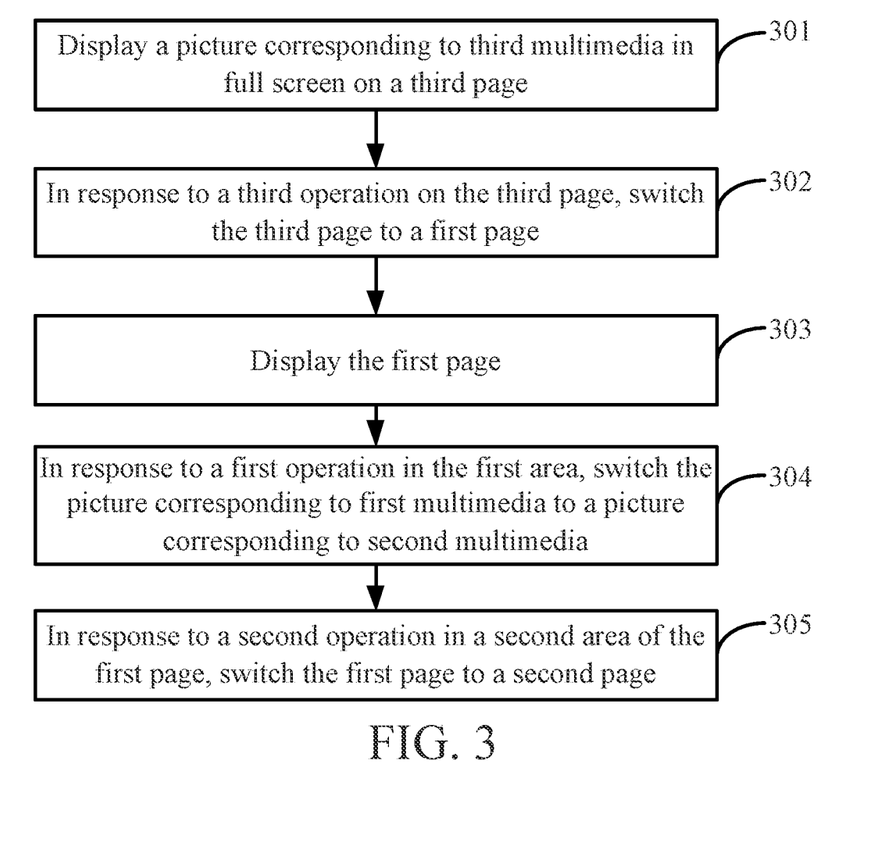
FIG. 3 is a flowchart of another page displaying method presented according to an exemplary embodiment of the present disclosure.

FIG. 3 is a flowchart of another page displaying method presented according to an exemplary embodiment. This embodiment describes a specific process of switching the multimedia page, including the following steps.

As shown in FIG. 3, in step 301, display a picture corresponding to third multimedia in full screen on a third page.

In the present embodiment, the third page may be a welcome page of a first screen of a website, and a full-screen responsive layout can be adopted to display the third page, thus improving the display effect of the page.

In step 302, in response to a third operation on the third page, switch the third page to a first page.

In the present embodiment, the third operation on the third page may be a preset operation performed by the user on the third page, for example, the third operation may be a sliding operation on the third page performed by the user, or the third operation may be an operation of switching to a forward direction. In one implementation, if the third page is a web page, and the user browses the third page through a device such as a desktop computer, the third operation may be an operation of clicking the left/right mouse button to slide in a preset direction in a preset area on the third page.

In another implementation, if the third page is a page of an application program, the user browses the third page through a device such as a mobile terminal, the third operation may be an operation of sliding in a preset direction on the third page through a touch screen. For example, the third operation may specifically be an operation of sliding up/down/left/right/clockwise/counterclockwise on the third page through the touch screen, etc.

The third page is a page before the first page, so when the third operation is detected, the third page can be switched to the first page.

In step 303, display the first page. In step 304, in response to a first operation in the first area, switch the picture corresponding to first multimedia to a picture corresponding to second multimedia. And in step 305, in response to a second operation in a second area of the first page, switch the first page to a second page.

For detailed processes of step 303, step 304 and step 305, reference can be made to the embodiment of FIG. 2A, which will not be described in detail in the present embodiment.

In another page displaying method provided by the present disclosure, when the multimedia page is displayed, the picture corresponding to first screen multimedia is displayed in full screen on the first screen page, after the preset operation on the first screen page is detected, the first screen page is switched to the second screen page, the video picture is displayed in the video area of the second screen page, the video picture displayed in the video area is switched when the operation in the video area is detected, and the second screen page is switched to the third screen page when the operation in non-video areas is detected, thereby further presenting a better dynamic display effect of a page for the user, enriching the interaction mode, further providing a faster operation way for the user, and helping to improve the user experience.

It should be noted that although the operations of the methods of the embodiments of the present disclosure are described in a specific order in the above-mentioned embodiments, this does not require or imply that these operations must be performed in this specific order, or all the operations shown must be performed to achieve the desired results. On the contrary, an execution order of the steps described in the flowchart can be changed. Additionally or alternatively, some steps may be omitted, multiple steps may be combined into one step for execution, and/or one step may be decomposed into multiple steps for execution.

Corresponding to the aforementioned embodiment of the page displaying method, the present disclosure also provides an embodiment of a page displaying apparatus.

Figure 4:
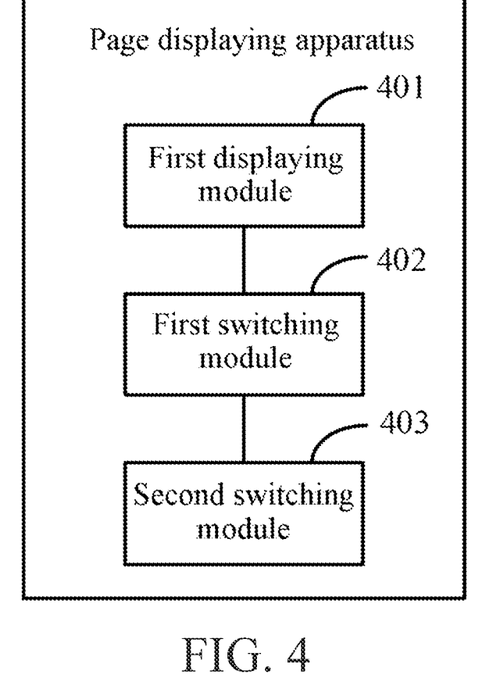
FIG. 4 is a block diagram of a page displaying apparatus presented according to an exemplary embodiment of the present disclosure.

As shown in FIG. 4, FIG. 4 is a block diagram of a page displaying apparatus presented according to an exemplary embodiment of the present disclosure. The apparatus may include: a first displaying module 401, a first switching module 402 and a second switching module 403.

The first displaying module 401 is configured to display a first page, where a first area of the first page displays a picture corresponding to first multimedia.

The first switching module 402 is configured to switch, in response to a first operation in the first area, the picture corresponding to the first multimedia to a picture corresponding to second multimedia.

The second switching module 403 is configured to switch, in response to a second operation in a second area of the first page, the first page to a second page. The first area and the second area are different areas without overlapping.

In some embodiments, the first displaying module 401 is configured to: display the first page, where the first area of the first page displays the picture corresponding to the first multimedia, and the second area of the first page displays introduction information corresponding to the first multimedia.

The first switching module 402 is configured to: switch, in response to the first operation in the first area, the picture corresponding to the first multimedia to the picture corresponding to the second multimedia, and switch the introduction information corresponding to the first multimedia to introduction information corresponding to the second multimedia.

In some other embodiments, the first area includes a first multimedia playing window, and the picture corresponding to the first multimedia is played in the first multimedia playing window.

The first switching module 402 switches the picture corresponding to the first multimedia to the picture corresponding to the second multimedia in the following manner: switching the picture corresponding to the first multimedia played in the first multimedia playing window to the picture corresponding to the second multimedia.

In some other embodiments, the first multimedia and the second multimedia correspond to a target multimedia set, the target multimedia set includes a plurality of multimedia arranged in a preset order, the first multimedia and the second multimedia are multimedia arranged adjacently in the target multimedia set.

In some other embodiments, the first switching module 402 is further configured to: under a condition that multimedia currently displayed in the first area is multimedia arranged in a last position in the target multimedia set, switch, in response to the first operation in the first area, the first page to the second page.

In some other embodiments, the apparatus may further include: a second displaying module and a third displaying module (not shown in the figure).

The second displaying module is configured to display a picture corresponding to third multimedia in full screen on a third page.

The third switching module is configured to switch, in response to a third operation on the third page, the third page to the first page.

In some other embodiments, a plurality of second multimedia playing windows are displayed on the second page, the respective second multimedia playing window displays a picture of corresponding candidate multimedia.

The apparatus may further include: a playing module (not shown in the figure).

The playing module is configured to play, in response to a fourth operation on any second multimedia playing window in the plurality of second multimedia playing windows, the picture of the candidate multimedia corresponding to the second multimedia playing window.

As for the apparatus embodiments, they basically correspond to the method embodiments, so reference can be made to the description of the method embodiments. The above-described apparatus embodiments are only schematic, in which the units described as separate components may or may not be physically separated, and the components displayed as units may or may not be physical units, that is, they may be located in one place or distributed over multiple network units. Some or all of the modules can be selected according to the actual needs to achieve the purpose of the embodiments of the present disclosure. Those of ordinary skills in the art can understand and implement the solution without making creative efforts.

Figure 5:
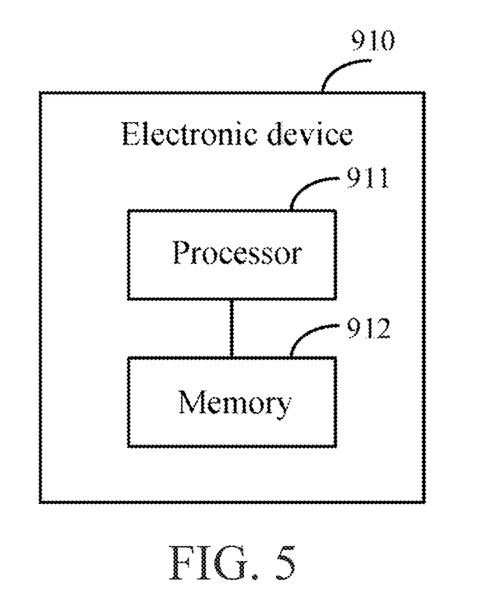
FIG. 5 is a schematic block diagram of an electronic device provided by some embodiments of the present disclosure.

FIG. 5 is a schematic block diagram of an electronic device provided by some embodiments of the present disclosure. As shown in FIG. 5, the electronic device 910 includes a processor 911 and a memory 912, which can be used to implement a client or a server. The memory 912 is configured to non-instantaneously store a computer-executable instruction (e.g. one or more computer program modules). The processor 911 is configured to execute the computer-executable instruction, and when the computer-executable instruction is executed by the processor 911, one or more steps in the above-mentioned page displaying method can be performed, so as to implement the above-mentioned page displaying method. The memory 912 and the processor 911 may be interconnected by a bus system and/or other forms of connection mechanisms (not shown).

For example, the processor 911 may be a central processing unit (CPU), a graphics processing unit (GPU), or other forms of processing unit with data processing capability and/or program execution capability. For example, the central processing unit (CPU) can have X86 or ARM architecture, etc. The processor 911 may be a general-purpose processor or a special-purpose processor, and may control other components in the electronic device 910 to perform desired functions.

For example, the memory 912 may include any combination of one or more computer program products, and the computer program products may include various forms of computer-readable storage medium, such as a volatile memory and/or a nonvolatile memory. The volatile memory may include, for example, a random access memory (RAM) and/or a high-speed cache memory (cache), etc. The nonvolatile memory may include, for example, a read-only memory (ROM), a hard disk, an erasable programmable read-only memory (EPROM), a portable compact disk read-only memory (CD-ROM), a USB memory, a flash memory, etc. One or more computer program modules may be stored on the computer-readable storage medium, and the processor 911 may run one or more computer program modules to implement various functions of the electronic device 910. The computer-readable storage medium can also store various applications and data, and various data used and/or generated by the applications.

It should be noted that, in the embodiments of the present disclosure, for the specific functions and technical effects of the electronic device 910, reference can be made to the above description of the page displaying method, which is not repeated here.

Figure 6:
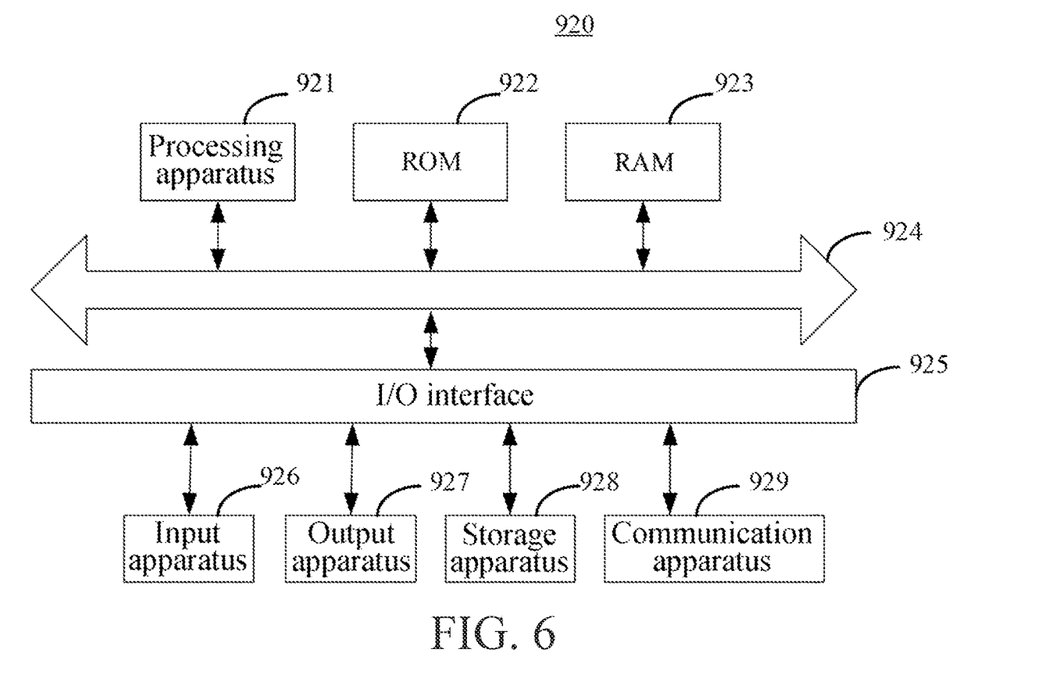
FIG. 6 is a schematic block diagram of another electronic device provided by some embodiments of the present disclosure.

FIG. 6 is a schematic block diagram of another electronic device provided by some embodiments of the present disclosure. The electronic device 920 is, for example, suitable for implementing the page displaying method provided by the embodiment of the present disclosure. The electronic device 920 may be a terminal device or the like, and may be used to implement a client or a server. The electronic device 920 may include, but is not limited to, mobile terminals such as a mobile phone, a notebook computer, a digital broadcast receiver, a PDA (personal digital assistant), a pad (tablet computer), a PMP (portable multimedia player), a vehicle-mounted terminal (e.g., vehicle navigation terminal), a wearable electronic device, etc., and fixed terminals such as a digital TV, a desktop computer, a smart home device, etc. It should be noted that the electronic device 920 shown in FIG. 6 is only an example, and it will not bring any restrictions on the functions and application scope of the embodiments of the present disclosure.

As shown in FIG. 6, the electronic device 920 may include a processing apparatus 921 (such as a central processing unit, a graphics processing unit, etc.), which may perform various appropriate actions and processes according to a program stored in a read only memory 922 (ROM) or a program loaded into a random access memory 923 (RAM) from a storage apparatus 928. In the RAM 923, various programs and data required for the operation of the electronic device 920 are also stored. The processing apparatus 921, ROM 922, and RAM 923 are connected to each other through a bus 924. An input/output (I/O) interface 925 is also connected to the bus 924.

Generally, the following apparatuses can be connected to the I/O interface 925: an input apparatus 926 including, for example, a touch screen, a touch panel, a keyboard, a mouse, a camera, a microphone, an accelerometer, a gyroscope, etc.; an output apparatus 927 including, for example, a liquid crystal display (LCD), a speaker, a vibrator, etc.; a storage apparatus 928 including a magnetic tape, a hard disk, etc.; and a communication apparatus 929. The communication apparatus 929 may allow the electronic device 920 to perform wireless or wired communication with other electronic devices to exchange data. Although FIG. 6 shows the electronic device 920 with various apparatuses, it should be understood that it is not required to implement or have all the apparatuses shown, and the electronic device 920 may alternatively implement or have more or less apparatuses.

For example, according to the embodiments of the present disclosure, the above page displaying method can be implemented as a computer software program. For example, embodiments of the present disclosure include a computer program product, which includes a computer program carried on a non-transitory computer-readable medium, and the computer program includes a program code for executing the above-mentioned page displaying method. In such an embodiment, the computer program can be downloaded and installed from a network through the communication apparatus 929, or installed from the storage apparatus 928 or the ROM 922. When the computer program is executed by the processing apparatus 921, the functions defined in the page displaying method provided by the embodiment of the present disclosure can be implemented.

Figure 7:
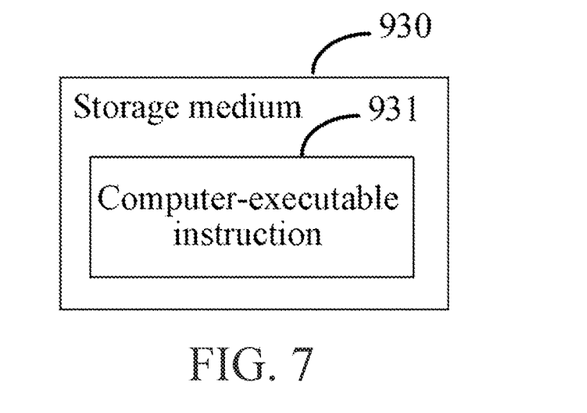
FIG. 7 is a schematic diagram of a storage medium provided by some embodiments of the present disclosure.

FIG. 7 is a schematic diagram of a storage medium provided by some embodiments of the present disclosure. For example, as shown in FIG. 7, the storage medium 930 may be a non-transitory computer-readable storage medium for storing a non-transitory computer-executable instruction 931. When the non-transitory computer-executable instruction 931 is executed by a processor, the page displaying method described in the embodiment of the present disclosure can be implemented. For example, when the non-transitory computer-executable instruction 931 is executed by a processor, one or more steps of the page displaying method described above can be performed.

For example, the storage medium 930 can be applied to the above-mentioned electronic device, and for example, the storage medium 930 may include a memory in an electronic device.

For example, the storage medium may include a memory card of a smart phone, a storage component of a tablet computer, a hard disk of a personal computer, a random access memory (RAM), a read-only memory (ROM), an erasable programmable read-only memory (EPROM), a portable compact disk read-only memory (CD-ROM), a flash memory, or any combination of the above storage media, or other suitable storage medium.

For example, for the description of the storage medium 930, reference can be made to the description of the memory in the embodiment of the electronic device, and the description will not be repeated. For the specific functions and technical effects of the storage medium 930, reference can be made to the above description of the page displaying method, which is not repeated here.

It should be noted that, in the context of the present disclosure, a computer-readable medium can be a tangible medium, which can contain or store a program that can be used by or in connection with an instruction execution system, apparatus or device. The computer-readable medium can be a computer-readable signal medium or a computer-readable storage medium or any combination of the above two. The computer-readable storage medium may be, for example, but not limited to, an electronic, magnetic, optical, electromagnetic, infrared, or semiconductor system, apparatus or component, or a combination of any of the above. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium can be any tangible medium that contains or stores a program that can be used by or in connection with an instruction execution system, apparatus or component. In the present disclosure, the computer-readable signal medium may include data signals propagated in a baseband or as part of a carrier wave, in which computer-readable program codes are carried. Such propagated data signal can take various forms, including but not limited to an electromagnetic signal, an optical signal or any suitable combination of the above. The computer-readable signal medium can also be any computer-readable medium other than the computer-readable storage medium, which can send, propagate or transmit a program that is used by or in connection with the instruction execution system, apparatus or component. The program code contained on the computer-readable medium can be transmitted by any suitable medium, including but not limited to: an electric wire, an optical cable, an RF (radio frequency), etc., or any suitable combination of the above.

Those skilled in the art will easily think of other embodiments of the present disclosure after considering the specification and practicing the invention disclosed herein. The present disclosure is intended to cover any variations, uses or adaptations of the present disclosure, which follow the general principles of the present disclosure and include common knowledge or common technical means in the technical field not disclosed in the present disclosure. And the specification and examples are to be regarded as examples only, and the true scope and spirit of the present disclosure are indicated by the claims.

It should be understood that the present disclosure is not limited to the precise structure described above and shown in the drawings, and various modifications and changes can be made without departing from its scope. The scope of the present disclosure is limited only by the appended claims.

What is claimed is:

1. A page displaying method, comprising:
   displaying a first page, wherein a first area in the first page displays an image corresponding to first multimedia, and a second area in the first page displays introduction information corresponding to the first multimedia;
   in response to a first operation in the first area, switching the image corresponding to the first multimedia to an image corresponding to second multimedia, and switching the introduction information corresponding to the first multimedia to introduction information corresponding to the second multimedia; wherein the first multimedia comprises first video content, and the second multimedia comprises second video content; and
   in response to a second operation in the second area in the first page, switching the first page to a second page.

2. The method according to claim 1, wherein the image corresponding to the first multimedia is an image of the first video content being played;
   wherein the first area comprises a first multimedia playing window;
   wherein the image corresponding to the first multimedia is played in the first multimedia playing window;
   wherein the switching the image corresponding to the first multimedia to the image corresponding to the second multimedia comprises:
     switching the image corresponding to the first multimedia played in the first multimedia playing window to the image corresponding to the second multimedia; and
   wherein the image corresponding to the second multimedia is an image of the second video content being played.

3. The method according to claim 1, wherein the first multimedia and the second multimedia correspond to a target multimedia set, the target multimedia set comprises a plurality of multimedia arranged in a preset order; and wherein the first multimedia and the second multimedia are multimedia arranged adjacently in the target multimedia set.

4. The method according to claim 3, further comprising:
under a condition that multimedia currently displayed in the first area is multimedia arranged in a last position in the target multimedia set, in response to the first operation in the first area, switching the first page to the second page.

5. The method according to claim 1, further comprising:
displaying an image corresponding to third multimedia in full screen on a third page; and
in response to a third operation on the third page, switching the third page to the first page.

6. The method according to claim 1, wherein a plurality of second multimedia playing windows are displayed on the second page, and each of the second multimedia playing windows displays a respective image of corresponding candidate multimedia; and wherein the method further comprises: in response to a fourth operation on any second multimedia playing window in the plurality of second multimedia playing windows, playing the image of the candidate multimedia corresponding to the second multimedia playing window.

7. A page displaying apparatus, comprising a memory and a processor, the memory storing an executable code, and when the processor executes the executable code, the processor being configured to:

display a first page, wherein a first area in the first page displays an image corresponding to first multimedia, and a second area in the first page displays introduction information corresponding to the first multimedia;

in response to a first operation in the first area, switch the image corresponding to the first multimedia to an image corresponding to second multimedia, and switch the introduction information corresponding to the first multimedia to introduction information corresponding to the second multimedia; wherein the first multimedia comprises first video content, and the second multimedia comprises second video content; and switch, in response to a second operation in the second area in the first page, the first page to a second page.

8. The apparatus according to claim 7, wherein the image corresponding to the first multimedia is an image of the first video content being played;

wherein the first area comprises a first multimedia playing window, and the image corresponding to the first multimedia is played in the first multimedia playing window;

wherein the processor is configured to switch the image corresponding to the first multimedia played in the first multimedia playing window to the image corresponding to the second multimedia; and wherein the image corresponding to the second multimedia is an image of the second video content being played.

9. The apparatus according to claim 7, wherein the first multimedia and the second multimedia correspond to a target multimedia set, the target multimedia set comprises a plurality of multimedia arranged in a preset order, the first multimedia and the second multimedia are multimedia arranged adjacently in the target multimedia set.

10. The apparatus according to claim 9, wherein the processor is further configured to:

under a condition that multimedia currently displayed in the first area is multimedia arranged in a last position in the target multimedia set, switch, in response to the first operation in the first area, the first page to the second page.

11. The apparatus according to claim 7, wherein the processor is further configured to:

display an image corresponding to third multimedia in full screen on a third page; and switch, in response to a third operation on the third page, the third page to the first page.

12. The apparatus according to claim 7, wherein a plurality of second multimedia playing windows are displayed on the second page, and each of the second multimedia playing windows displays a respective image of corresponding candidate multimedia, and the processor is further configured to:

play, in response to a fourth operation on any second multimedia playing window in the plurality of second multimedia playing windows, the image of the candidate multimedia corresponding to the second multimedia playing window.

13. A non-transitory computer-readable storage medium storing a computer program, when the computer program is executed in a computer, the computer being caused to:

display a first page, wherein a first area in the first page displays an image corresponding to first multimedia, and a second area in the first page displays introduction information corresponding to the first multimedia;

in response to a first operation in the first area, switch the image corresponding to the first multimedia to an image corresponding to second multimedia, and switch the introduction information corresponding to the first multimedia to introduction information corresponding to the second multimedia; wherein the first multimedia comprises first video content, and the second multimedia comprises second video content; and in response to a second operation in the second area in the first page, switch the first page to a second page.

14. The storage medium according to claim 13, wherein the image corresponding to the first multimedia is an image of the first video content being played;

wherein the first area comprises a first multimedia playing window, and the image corresponding to the first multimedia is played in the first multimedia playing window;

wherein the computer is configured to switch the image corresponding to the first multimedia played in the first multimedia playing window to the image corresponding to the second multimedia; and wherein the image corresponding to the second multimedia is an image of the second video content being played.

15. The storage medium according to claim 13, wherein the first multimedia and the second multimedia correspond to a target multimedia set, the target multimedia set comprises a plurality of multimedia arranged in a preset order, the first multimedia and the second multimedia are multimedia arranged adjacently in the target multimedia set.

16. The storage medium according to claim 15, wherein the computer is further configured to:

under a condition that multimedia currently displayed in the first area is multimedia arranged in a last position in the target multimedia set, switch, in response to the first operation in the first area, the first page to the second page.

17. The storage medium according to claim 13, wherein the computer is further configured to:
   display an image corresponding to third multimedia in full screen on a third page; and
   switch, in response to a third operation on the third page, the third page to the first page.

\* \* \* \* \*